United States Patent
Arnold

(10) Patent No.: US 12,162,979 B2
(45) Date of Patent: Dec. 10, 2024

(54) ORGANIC POLYMERIC COMPOSITIONS

(71) Applicant: Michael John Arnold, Beverly Hills, CA (US)

(72) Inventor: Michael John Arnold, Beverly Hills, CA (US)

(73) Assignee: Michael John Arnold, Beverly Hills, CA (US)

( * ) Notice: Subject to any disclaimer, the term of this patent is extended or adjusted under 35 U.S.C. 154(b) by 0 days.

(21) Appl. No.: 17/753,549

(22) PCT Filed: Sep. 8, 2020

(86) PCT No.: PCT/US2020/049735
§ 371 (c)(1),
(2) Date: Mar. 7, 2022

(87) PCT Pub. No.: WO2021/046533
PCT Pub. Date: Mar. 11, 2021

(65) Prior Publication Data
US 2022/0348711 A1 Nov. 3, 2022

Related U.S. Application Data

(60) Provisional application No. 62/897,012, filed on Sep. 6, 2019.

(51) Int. Cl.
*C08G 61/10* (2006.01)
*H01G 11/48* (2013.01)

(52) U.S. Cl.
CPC ............ *C08G 61/10* (2013.01); *H01G 11/48* (2013.01)

(58) Field of Classification Search
CPC ............... C08G 61/10; C08G 2261/91; C08G 2261/314; H01G 11/48; H01L 51/0077; Y02E 10/549
See application file for complete search history.

(56) References Cited

U.S. PATENT DOCUMENTS

| 5,585,454 | A | 12/1996 | Yamamoto |
| 6,277,518 | B1 | 8/2001 | Naoi et al. |
| 2015/0194608 | A1* | 7/2015 | Chiu .................... C08G 61/126 524/588 |
| 2016/0362522 | A1* | 12/2016 | Pen ........................ C08G 79/10 |

FOREIGN PATENT DOCUMENTS

| EP | 0924782 A1 | 6/1999 |
| WO | 0178162 A2 | 10/2001 |
| WO | 2015048550 A1 | 4/2015 |

OTHER PUBLICATIONS

Chen et al., J. Am. Chem. Soc., vol. 117, No. 1, 1995.*
Morisaki et al. (Prog. Polym. Sci. 33 (2008) 346-364).*
Huber et al. (Macromol. Rapid Commun. 15, 867-902, (1994).*
International Search Report and Written Opinion dated Dec. 10, 2020 from corresponding PCT Application No. PCT/US2020/049735.
Zhao et al. Polymer Electrode Materials for Sodium-ion Batteries', Materials, 2018, vol. 11, 1-6 2567, pp. 1-18; doi:10.3390/ma11122567. abstract; p. 4, para 5 to p. 5, para 2; Figure 2; Scheme 2.
Le Gall et al. Poly (2,5-dihydroxy-1,4-benzoquinone-3,6-methylene): a new organic polymer as positive electrode material for rechargeable lithium batteries, Journal of Power Sources, 2003, 1-6 vols. 119-121, pp. 316-320. https://doi.org/10.1016/S0378-7753(03)00167-8. abstract; p. 317, Fig. 1.
Extended European Search Report in EP20861274.7, mailed Oct. 19, 2023, 9 pages.
Yamamoto et al., "Preparation of Pi-Conjugated Poly(hydroquinone-2,5-diyl) and Poly(p-benzoquinone-2,5-diyl) and their electrochemical behavior," Macromolecules, Apr. 1998, vol. 31, No. 8, pp. 2683-2685.
Yassin et al., "Polymerization products of p-benzoquinone as thermal stabilizers for rigid poly(vinyl chloride): Part I—Preparation of the stabilizer," Polymer Degradation and Stability, Jan. 1985, vol. 13, No. 2, pp. 167-181.

* cited by examiner

*Primary Examiner* — Shane Fang
(74) *Attorney, Agent, or Firm* — ARENTFOX SCHIFF LLP

(57) ABSTRACT

A polymer comprising recurring units derived from organic unsaturated planar ring monomers. The recurring units are stacked, linked to one another by linkers, and are capable of undergoing oxidation and/or reduction, and the polymer is electrically conducting.

17 Claims, No Drawings

ORGANIC POLYMERIC COMPOSITIONS

CROSS REFERENCE TO RELATED APPLICATION(S)

This application is a national phase entry of PCT Application No. PCT/US2020/049735, entitled "ORGANIC POLYMERIC COMPOSITION" and filed on Sep. 8, 2020, which claims priority U.S. Provisional Application No. 62/897,012, entitled "ORGANIC POLYMERIC COMPOSITION" and filed on Sep. 6, 2019, both of which are expressly incorporated by reference herein in their entirety.

FIELD OF THE INVENTION

The present invention relates to the field of material science, and specifically to the fields of organic conducting and semi-conducting polymers with applications including energy storage and energy flow battery systems.

BACKGROUND

Conduction systems based on metals are ubiquitous. However, most of the raw material needed to sustain such systems is obtained from the earth by mining. These raw materials are massive, unwieldy, and hard to move, and therefore, expensive to transport. Also, natural resources are finite and mining has a negative impact on the environment. A need exists for an alternative to conventional metal conduction systems.

Polymers, because of their light weight and ease of fabrication, continue to replace metals in many areas of applications. Polymers are electrical insulators and many of their applications rely on this insulating property. However, certain conjugated polymers (those possessing an extended π-conjugation along the polymer backbone) can exhibit semiconducting behavior. The discovery of doping, the process by which the polymer is either oxidized or reduced to create charge carriers, was found to lead to a further dramatic increase in the conductivity of such conjugated polymers.

Electrically conducting polymers and their uses have been described. For example, US Patent Application Publication US 20200176762A1 describes electron conducting polymer composites and their uses as electrode materials; U.S. Pat. No. 4,663,001 describes electroconductive polymers derived from heterocyclic polycyclic monomers; and Ates M et al., *Current Physical Chemistry*, 2012, 2, 224-240, describes conducting polymers and their applications. Among conjugated polymers, polyacetylene, has been studied the most because it has the simplest molecular framework. However, it has certain drawbacks such as insolubility, infusibility, and poor environmental stability, which have made it an unattractive choice for many technological applications. On the other hand, conjugated polymers based on polyaniline, polypyrroles, polythiophenes, and polyphenylene vinylenes, have found many applications.

A need exists, nonetheless, for improved conducting polymers that, for example, allow for a better rate of doping, are more amenable to modulation of conductivity, and have higher energy storage capacity per unit weight.

SUMMARY

The present disclosure provides novel organic electrically conducting polymers.

In one aspect, provided herein is a polymer containing recurring units derived from organic unsaturated planar ring monomers, the recurring units being stacked and linked to one another by linkers. The recurring units are capable of undergoing oxidation and reduction, thereby making the polymer electrically conducting.

The polymers can be generally represented as shown below in Schemes 1-3, wherein the substituents are defined as follows.

X is selected from the group consisting of —O, —S, —NR, —SiR$_2$, —CR$_2$O, and —CR$_2$, wherein the bond in each of these groups connects to the linker, wherein R is selected from the group consisting of hydrogen, C$_{1-n}$ alkyl, C$_{1-n}$ alkoxy, hydroxyl, thiol, aryl, halogen, cyano, amino, SO$_3$H, nitro, carboxyl, phosphoryl, and phosphonyl, wherein n is a number between 1 and 20;

Y is selected from the group consisting of O, S, and NR, when attached to a ring in the monomer in oxidized form; and from the group consisting of OH, SH, OR, NR$^1$R$^2$, and OSiR$_3$ when attached to a ring in the monomer in reduced form, wherein R and each of R$^1$ and R$^2$ is independently selected from the group consisting of hydrogen, alkyl, alkoxy, hydroxyl, aryl, halogen, cyano, and amino; and the linker is a bond or an alkylene, saturated or unsaturated, having 1-20 carbon atoms, optionally substituted by a heteroatom containing functional group selected from the group consisting amino, cyano, hydroxyl, sulfydryl, silyl, ether, crown ether, and a metal ligand, wherein each linker connects two X groups on adjacent monomers.

Scheme 1: General description of the connectivity and the skeleton of one embodiment of the polymers. One ring ("benzoid") per stacking unit is depicted.

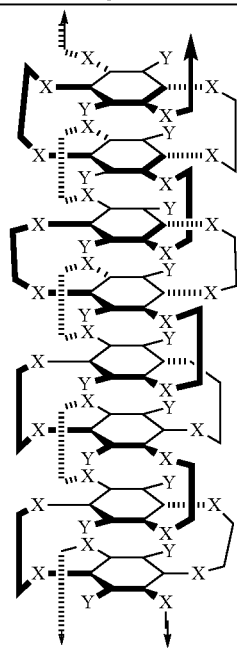

Scheme 2: General description of the connectivity and the skeleton of one embodiment of the polymers. One ring ("napthyl") per stacking unit is depicted

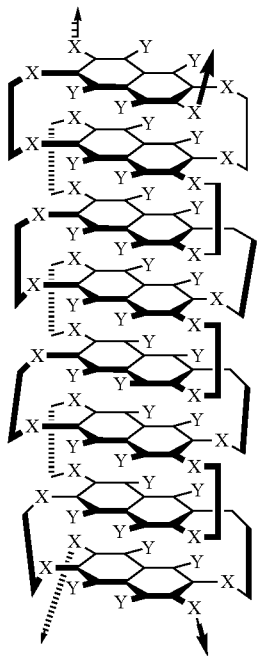

Scheme 3. General description of the connectivity and the skeleton of one embodiment of the polymers. One ring ("anthryl") per stacking unit is depicted.

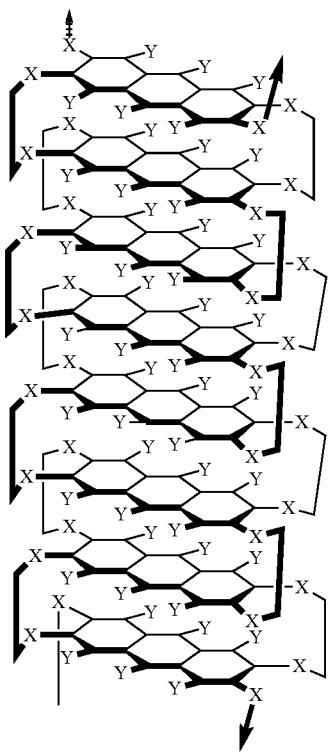

DETAILED DESCRIPTION

Novel organic polymers having recurring units derived from organic unsaturated planar ring monomers are provided. The recurring units are stacked and linked (tethered) to one another by linkers. Further, the recurring units are capable of undergoing oxidation and reduction, thereby making the polymer electrically conducting.

The electrically conducting polymers described herein provide many advantages over the monomeric quinone-hydroquinone-based redox systems for storing and delivering electrical energy that are currently known (see, for example, WO 2015/048550 entitled "Quinone and Hydroquinone Based Flow Battery"). The advantages arise due at least in part to the novel stacked-and-tethered configuration of quinone compounds, which provide superior performance compared to their quinone monomer counterparts. Specifically, the stacked array of quinone moieties juxtaposed with proper alignment (due to the covalent tethering) gives rise to a unique resonance effect. This resonance varies based on the chain length of the polymer and the substituents and oxidation states of each of the quinone moieties of the polymer, and can be very strong. It is believed that the resonance of the magnitude achievable by the stacked and tethered polymers of poly-quinone, poly-hydroquinone, poly-semiquinone and poly-quinhydrone monomers of the present disclosure is not achievable in any other configuration of these monomers.

Compared to the monomeric quinone-hydroquinone-based redox systems, the polymers described herein are much larger (and rod-like), which allows for increased impermeability through the small pores that exist between cells in fluid cell batteries and similar devices, thereby potentially significantly increasing the lifetime of these devices. Further, unlike the currently known the monomeric quinone-hydroquinone-based redox system, the polymers described herein can be used as semi-conductors.

Also, unlike the known monomeric quinone-hydroquinone-based redox system, selected polymers described herein may have the property of magnetic susceptibility, and thus may be used in the field of micro-magnetics.

The spectroscopic and molecular dynamics properties of the polymers of the stacked quinone-hydroquinone compounds described herein also render the polymers superior to the monomeric quinones and hydroquinones. It is believed that an array of stacked and tethered polymers described herein would have an abundance of spectroscopic states due to the many different structures the array may have. This property is expected be advantageous in the preparation of heat sensitive dyes using these polymers. The different spectroscopic states are expected to allow for tunability of the wavelengths of the heat sensitive dyes having the polymers given that wavelength emitted or absorbed by these dyes is subject to thermal perturbations. Similarly, it is believed that with laser dyes incorporating these polymers, the wavelength of choice may be obtained by varying the substituents and/or chain length, and/or the redox state of the polymer.

Another distinguishing feature of the polymers described herein is directionality, since the polymers provide for electron conductivity only in the direction of the stack. Current flow in directions orthogonal to the stack is not permitted This directionality may be best exploited in solids comprising these polymers.

General Description of Polymers

Schemes 1-3 above generally depict the connectivity and the skeleton of three different embodiments of the polymers.

One ring per stacking unit is depicted. Oxidation state of the monomers is not shown. Various other embodiments are shown below in Schemes 4-17. In the polymers shown in these Schemes, the substituents are as define in Schemes 1-3.

Schemes 4-6 also provide a general description of different embodiments of the polymers described herein. Here, oxidation states of the polymers are shown. The benzoid (Scheme 4), napthyl (Scheme 5), and the anthryl based polymers are all depicted in the fully oxidized state.

Schemes 7-9 below show embodiments in which Y is O (oxidized form) or OH (reduced form). These polymers are referred to as polyquinones.

Schemes 10-12 below show polymers in mixed oxidation state.

Schemes 13 and 14 show one of several tautomeric states of the polymers of the present disclosure.

Scheme 15 shows a polymer having OCH$_2$ as X and a bond as the linker. The fully oxidized polyquinone form is shown.

Scheme 16 shows a polymer having OCH$_2$ as X and a bond as the linker. The fully reduced polyquinhydrone form is shown.

Scheme 17 shows a poly-benzoid quinhydrone (half-oxidized) polymer with OCH$_2$ as X and a bond as the linker. Only one tautomer of the many possible is shown.

Scheme 5. General description of one embodiment of the polymer that has two rings ("napthyl") in fully oxidized state per stacking unit.

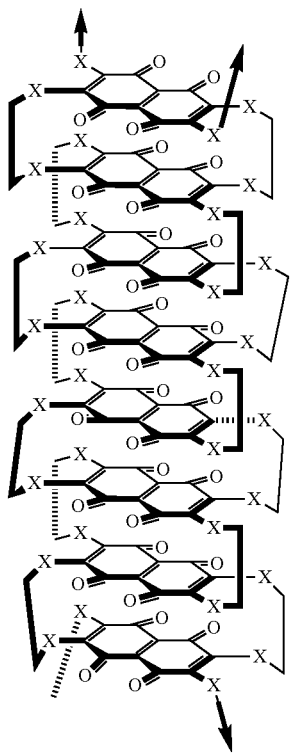

Scheme 4. General description of one embodiment of the polymer that has one ring ("benzoid") in fully oxidized state per stacking unit.

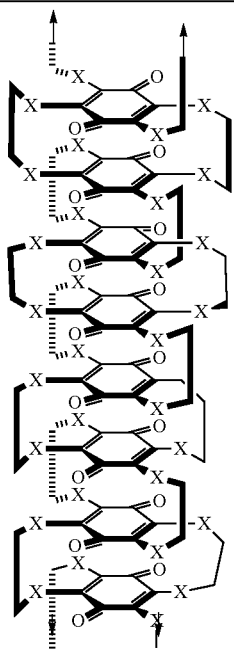

Scheme 6. General description of one embodiment of the polymer that has three rings ("anthryl") in fully oxidized state per stacking unit.

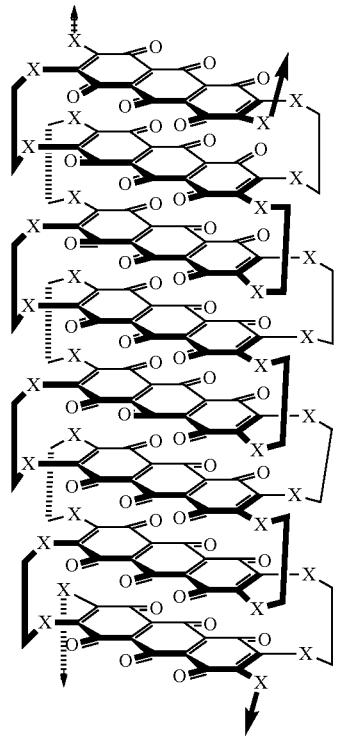

Scheme 7. Polyquinone having one ring ("benzoid") per stacking unit. The oxidized form is depicted.

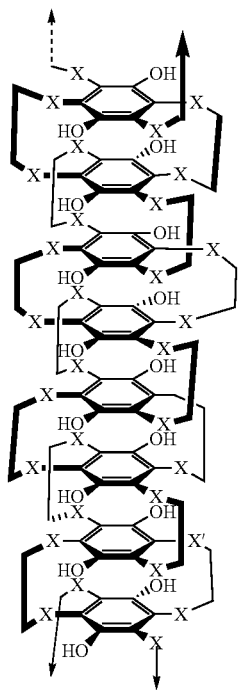

Scheme 9. Polyquinone having three rings ("anthryl") per stacking unit. The reduced form is depicted.

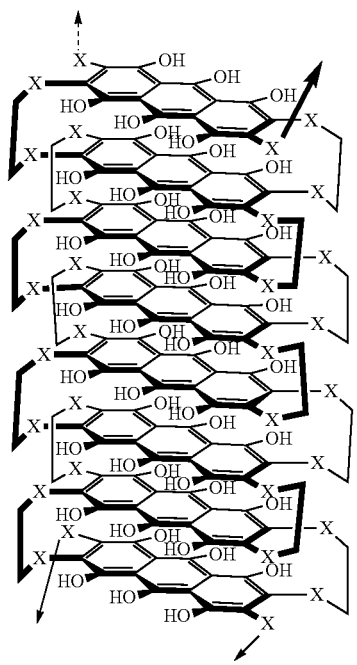

Scheme 8. Polyquinone having two rings ("napthyl") per stacking unit. The reduced form is depicted.

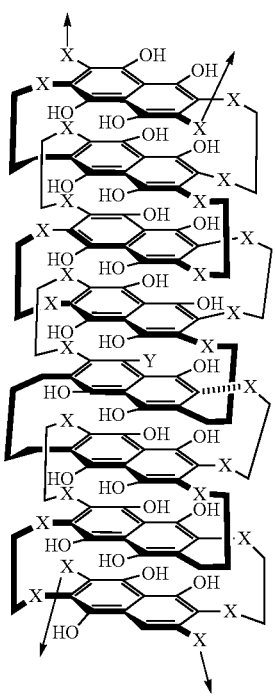

Scheme 10. Polymer having one ring ("benzoid") in a mixed oxidation state (polyquinhydrone) is shown (oxidized and reduced recurring units alternate)

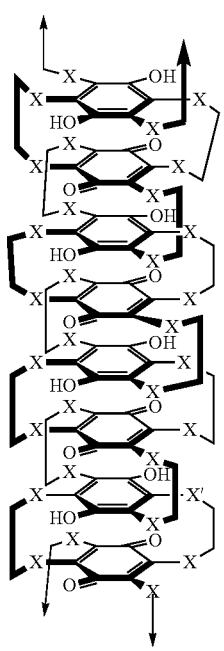

Scheme 11: Polymer having two rings ("napthyl") in a mixed oxidation state (polyquinhydrone) in each recurring stacked unit (one ring in the oxidized and the other in the reduced state)

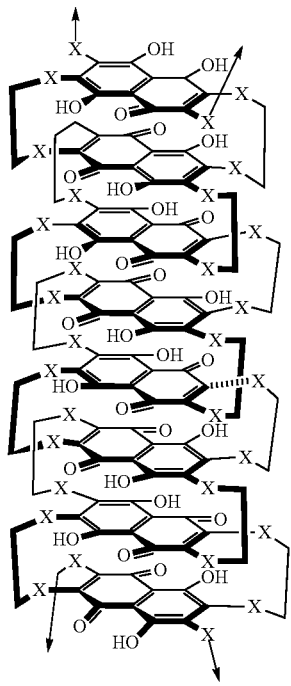

Scheme 12: Polymer having three rings ("anthryl") in mixed oxidation state (polyquinhydrone; fully oxidized and fully reduced recurring units alternate)

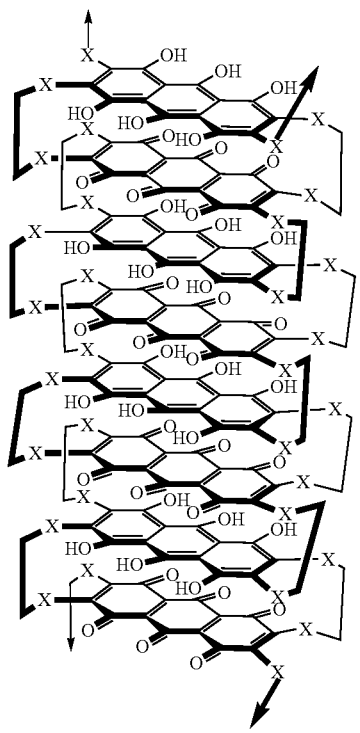

Scheme 13: Two electron/two proton reduced "tautomeric" form of stacked polyquinone polymer is shown. One ring ("benzoid") per stacking unit is depicted. Many tautomers may be in equilibrium, with fast exchangerates, which may depend on the state and/or the solvation of the polymers.

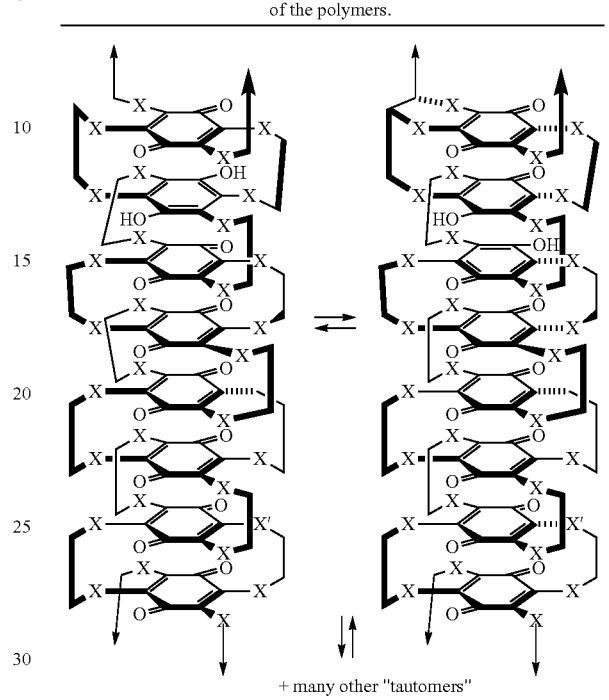

+ many other "tautomers"

It should be noted that the tautomeric equilibrium may altered by changing pH. Further, metal cations may be utilized in the place of protons as a counter ion for the reduced organic polymers described herein. These metals cations include the monovalent cations, e.g., lithium, sodium, potassium, and cesium cations; and divalent cations, e.g., calcium and magnesium cations and others. Other metallic salts are contemplated to be well within the scope of the present invention and may be useful for various applications (e.g., as semi-conductors, dyes, or fluid battery). An example of a mono-metallic salt of the organic polymers described herein is shown in Scheme 14 below.

Scheme 14: Two electron/two proton reduced tautomeric form of stacked polyquinone polymer is shown. Many tautomers may be in equilibrium, with fast exchange rates, which may depend on the state and/or the solvation of the polymers.

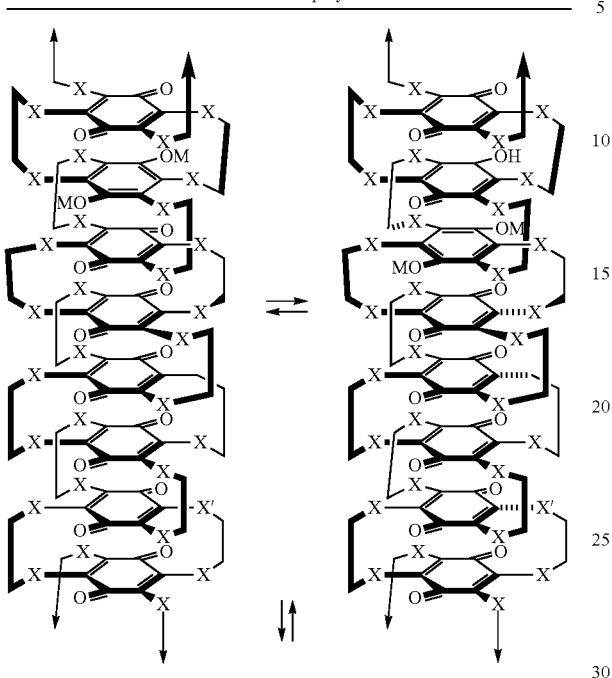

Scheme 15: Polymer having OCH$_2$ as X. The fully oxidized polyquinone is shown.

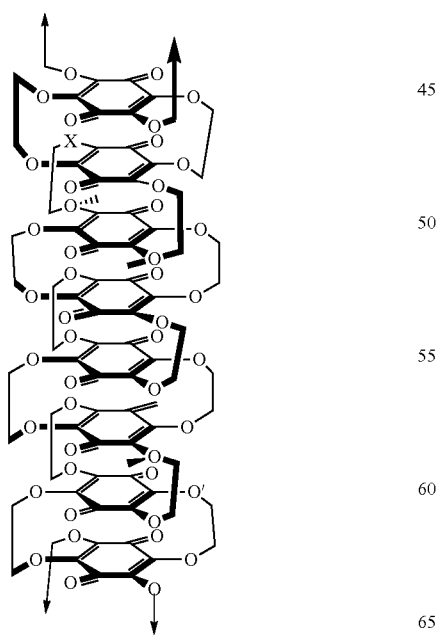

Scheme 16. Polymer having OCH$_2$ as X. Fully reduced, i.e. polyhydroquinone form is show.

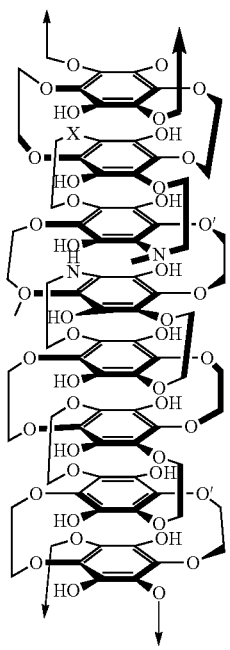

Scheme 17: An example of a poly-benzoid quinhydrone (half-oxidized) polymer is shown. Here, X is OCH$_2$. Only one tautomer of the many possible is shown.

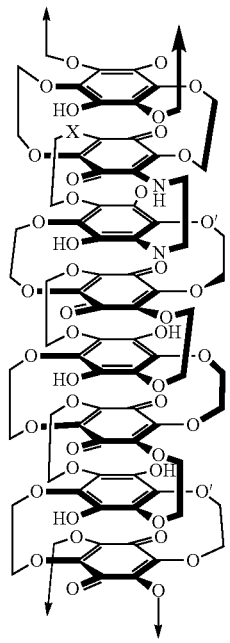

Specific Embodiments

In a first embodiment, provided herein is a polymer comprising recurring units derived from organic unsaturated planar ring monomers. The recurring units are stacked, linked to one another by linkers, and are capable of undergoing oxidation and/or reduction, and the polymer is electrically conducting.

In a second embodiment, provided herein is the polymer of the first embodiment, wherein the monomer is monocyclic (benzoid), bicyclic (napthyl), or tricyclic (anthryl)
wherein the monomer may be in fully oxidized form (quinone), fully reduced form (hydroquinone), partially reduced form (semi-quinone), or any mixture thereof, wherein the monocyclic, the bicyclic, and the tricyclic monomer monomer has formulas I, II, and III, respectively, in their fully oxidized form;

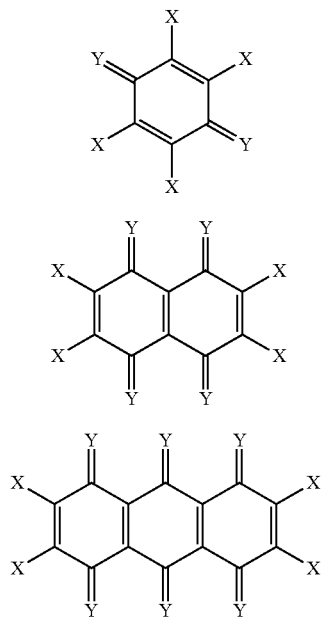

wherein X is selected from the group consisting of —O, —S, —NR, —SiR$_2$, —CR$_2$O, and —CR$_2$, wherein the bond in each of these groups connects to the linker, wherein R is selected from the group consisting of hydrogen, C$_{1-n}$ alkyl, C$_{1-n}$ alkoxy, hydroxyl, thiol, aryl, halogen, cyano, amino, SO$_3$H, nitro, carboxyl, phosphoryl, and phosphonyl, wherein n is a number between 1 and 20;

Y is selected from the group consisting of O, S, NR, when attached to a ring in the monomer in oxidized form; and from the group consisting of OH, SH, OR, NR$^1$R$^2$, and OSiR$_3$ when attached to a ring in the monomer in reduced form, wherein R, and each of R$^1$ and R$^2$ is independently selected from the group consisting of hydrogen, alkyl, alkoxy, hydroxyl, aryl, halogen, cyano, and amino; and the linker is a bond or an alkylene, saturated or unsaturated, having 1-20 carbon atoms, optionally substituted by a heteroatom containing functional group selected from the group consisting of amino, cyano, hydroxyl, sulfydryl, silyl, ether, crown ether, and a metal ligand, wherein each linker connects two X groups on adjacent monomers.

In a third embodiment, provided herein is a the polymer of embodiments 1 or 2, wherein each monomer is in a fully oxidized (quinone) form.

In a fourth embodiment, provided herein is a the polymer of embodiments 1 or 2, wherein each monomer is in a fully reduced (hydroquinone) form.

In a fifth embodiment, provided herein is the polymer of embodiments 1 or 2, wherein all of the monomers are in a partially oxidized or partially reduced form (semi-quinone or quinhydrone form, respectively).

In a sixth embodiment, provided herein is the polymer of embodiments 1 or 2, wherein a portion of the monomers are in a partially oxidized or partially reduced form (semi-quinone or quinhydrone form, respectively), and the remaining monomers are in the fully oxidized or fully reduced form (quinone or hydroquinone form, respectively). This embodiment has many tautomeric forms.

In a seventh embodiment, provided herein is the polymer of embodiments 4-6, wherein the hydrogen in one or more hydroquinone moieties are replaced with metal cations.

In an eighth embodiment, provided herein is the polymer of embodiment 7, wherein the cation is a monovalent metal cation.

In an ninth embodiment, provided herein is the polymer of embodiment 7, wherein the cation is a divalent metal cation.

In a tenth embodiment, provided herein is the polymer any of the preceding embodiments, wherein X is NR.

In a eleventh embodiment, provided herein is the polymer of embodiment 10, wherein R is a methyl group.

In a twelfth embodiment, provided herein is the polymer of any of the preceding embodiments, wherein X is same in all monomers of the polymer.

In a thirteenth embodiment, provided herein is the polymer of any of the embodiments 1-11, wherein X is not same in all monomers of the polymer.

In a fourteenth embodiment, provided herein is the polymer of any of the embodiments 1-11, wherein not all X in a monomer are same.

In a fifteenth embodiment, provided herein is the polymer of any of the preceding embodiments, wherein the linker is an ethylene group.

In a sixteenth embodiment, provided herein is the polymer of any of the preceding embodiments, wherein each recurring unit is linked to an adjacent recurring unit by at least two linkers.

In a seventeenth embodiment, provided herein is the polymer of any of the preceding embodiments, wherein the momomers are in quinone, hydroquinone, and/or semi-quinone/quinhydrone form, and wherein Y is O in the fully oxidized quinone momomer ring, Y is OH in the fully reduced hydroquinone monomer ring, and Y is O or OH in a monomer ring with mixed oxidation state.

Further, it should be understood that contemplated herein are also polymers having greater than three rings per monomer. For example, the polymer may comprise tetracyclic monomers. Further contemplated are also polymers in which the monomers include one or more heteroatoms. Also contemplated herein are polymers that have a mixture of monomers selected from monocyclic, bicyclic, tricyclic and tetracyclic monomers. Also contemplated herein are polymers in which the two substituents in each monomer involved in forming linkage with an adjacent monomer (i.e., X), are in the ortho or meta position.

Unless described otherwise, by "alkyl" is meant straight chain or branched saturated or unsaturated groups from 1 to 20 carbons. Alkyl groups are exemplified by methyl, ethyl, n- and iso-propyl, n-, sec-, iso- and tert-butyl, neopentyl, and the like, and may be optionally substituted with one, two, three, or, in the case of alkyl groups of two carbons or more, greater than three substituents independently selected from the group consisting of halo, hydroxyl, $C_{1-6}$ alkoxy, $SO_3H$, amino, nitro, carboxyl, phosphoryl, phosphonyl, thiol, $C_{1-6}$ alkyl ester, $C_{1-6}$ alkyl thio, and oxo, or an ion thereof.

As used herein, "alkoxy" means a group of formula —OR, wherein R is an alkyl group, as defined herein.

As used herein, "alkyl thio" means —S—R, where R is an alkyl group, as defined herein.

As used herein, "alkyl ester" means —COOR, where R is an alkyl group, as defined herein.

As used herein, "halo" means, fluoro, chloro, bromo, or iodo.

As used herein, "hydroxyl" means —OH.

As used herein, "amino" is means —NH₂.

As used herein, "nitro" means —NO₂.

As used herein, "carboxyl" means —COOH.

As used herein, "oxo" means =O.

As used herein, "sulfonyl" means —SO₃H.

As used herein, "thiol" means —SH.

General Methods for Synthesis of Polymers

The polymers of the present invention may be synthesized by stepwise methods, as shown below in Schemes 18 and 19, or by bulk polymerization of block monomers, as shown in Schemes 20 and 21. Scheme 20 shows a method of synthesizing a block monomer and its extension stepwise to generate polymers of known chain length, sequence, and composition. Scheme 21 shows in-situ head-to-tail polymerization of the polymers generated in Scheme 20.

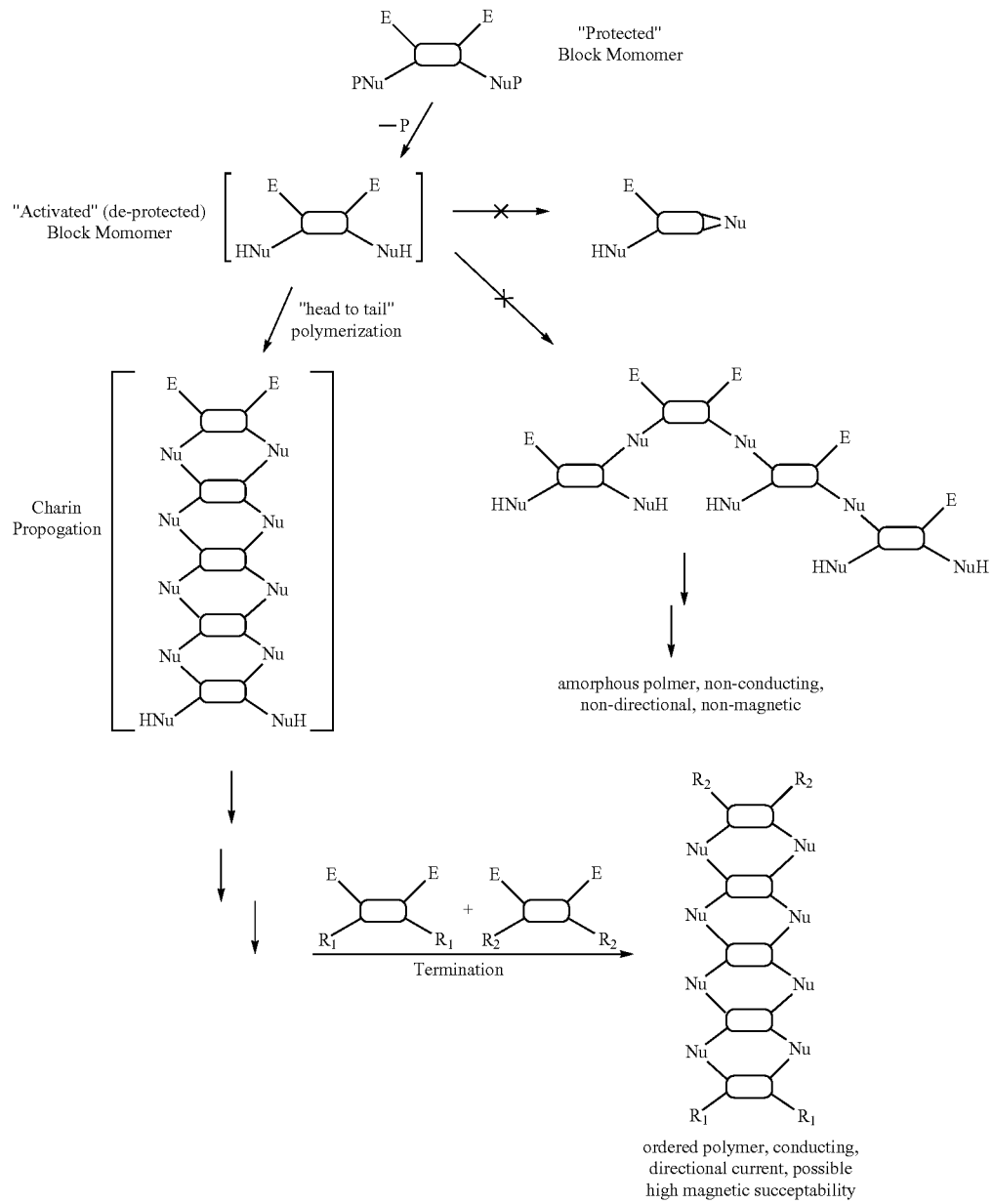

Scheme 18: A General "One-pot" Block Polymerization Synthesis.

As shown above, the desired polymer results from head to tail polymerization. Also, as shown above, intramolecular substitution would nullify the reactive pathway that gives rise to the desired polymer. Thus, in order to achieve the desired stacked polymer, the Electrophilic (E) and the nucleophilic (Nu) ends have to be a distance far enough away such that the nucleophile does not react intramolecularly with its electrophillic counterpart.

Scheme 19: A general Stepwise Polymerization synthesis - Synthesis of
Block Monomers and of Polymers of Controlled Chain-Length, Sequence and Composition

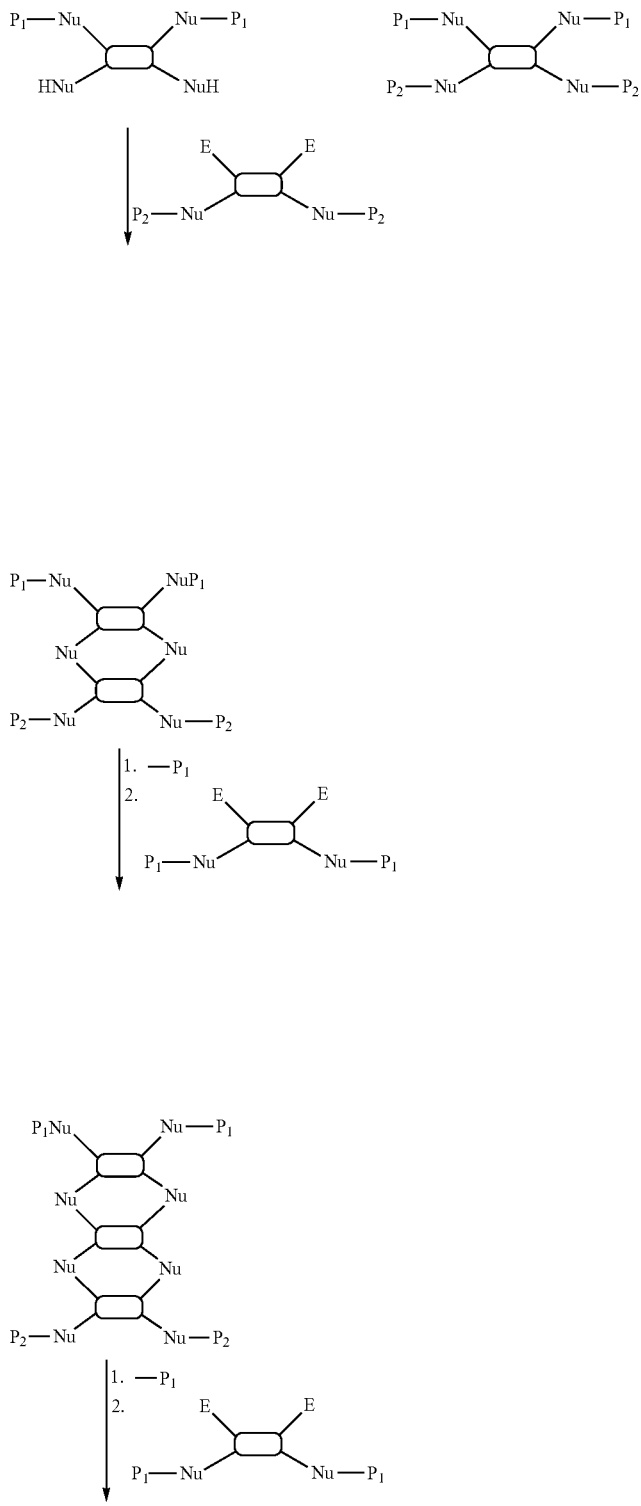

-continued
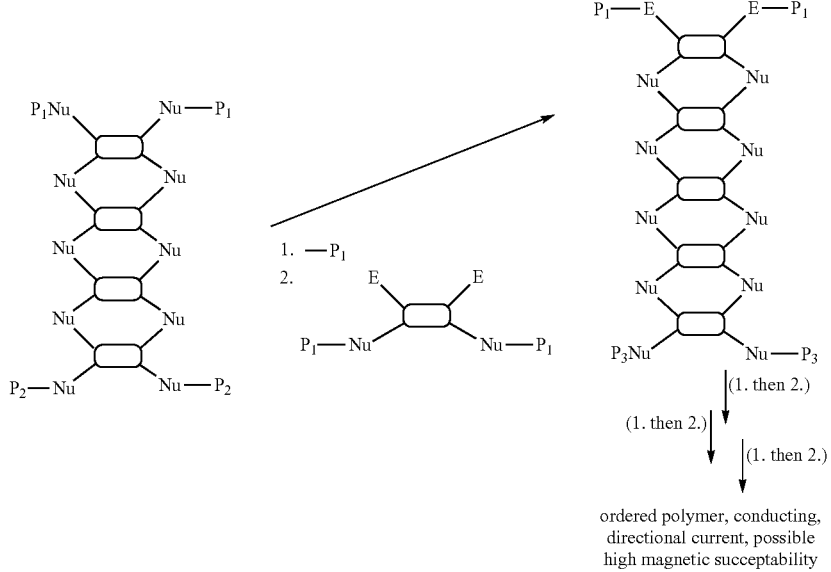
ordered polymer, conducting, directional current, possible high magnetic susceptability
Scheme 20: Synthesis of block monomer and its extension stepwise (Chloranil used as the starting material.
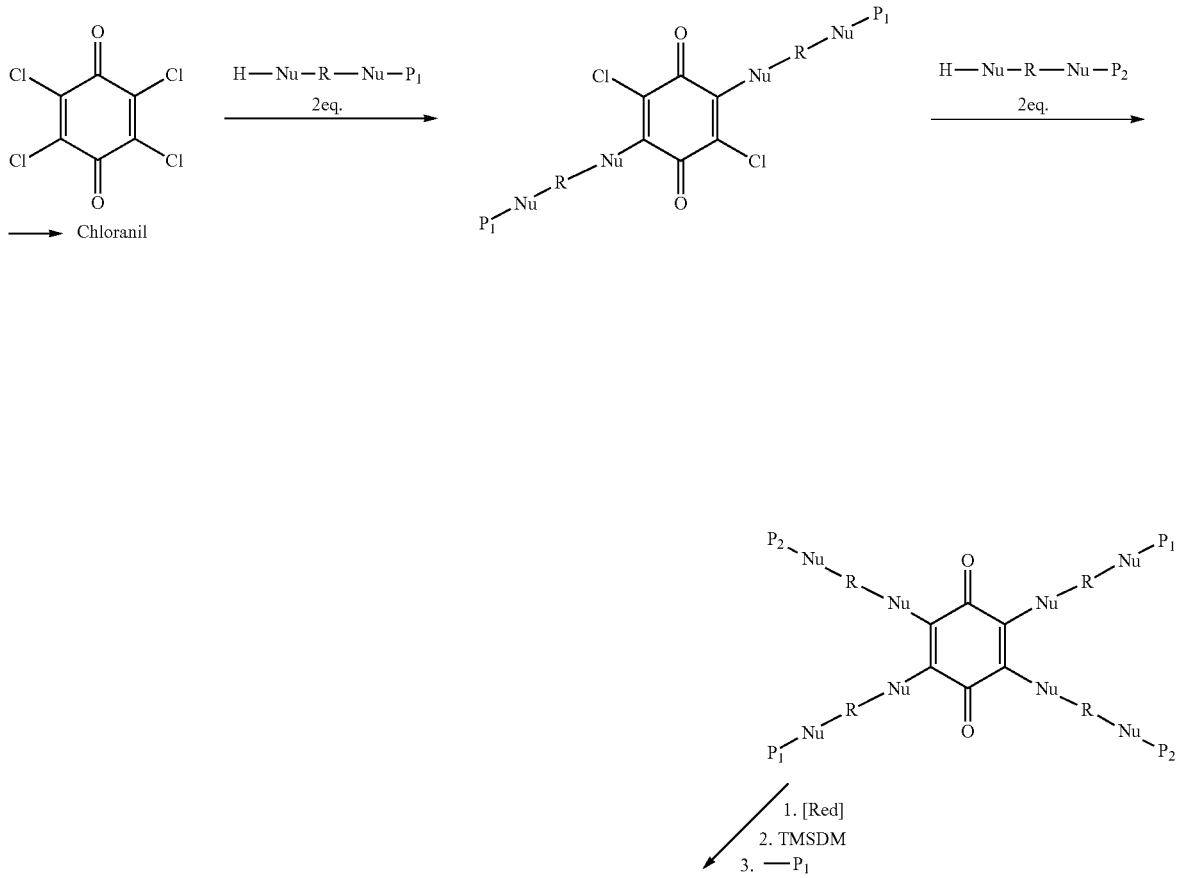

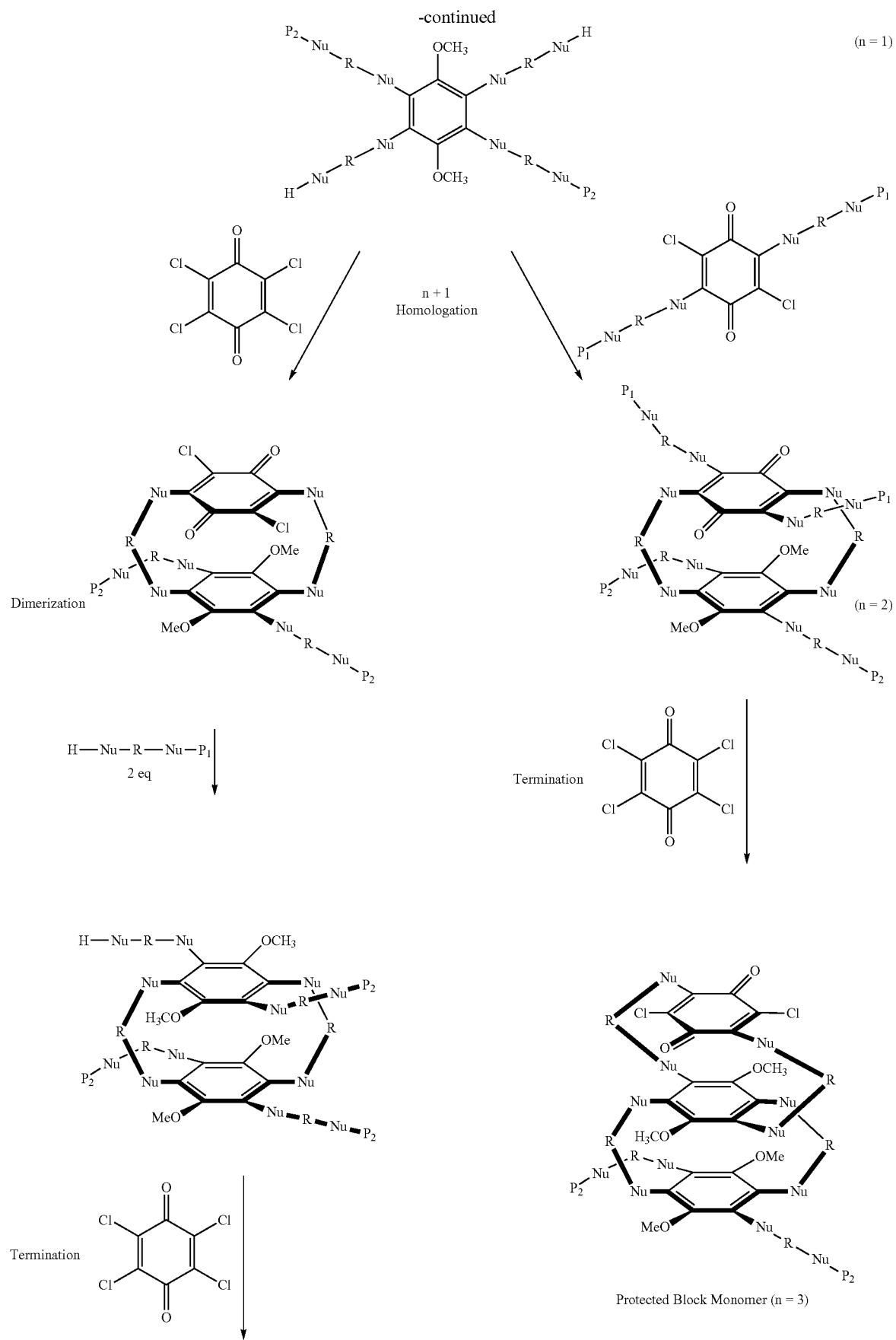

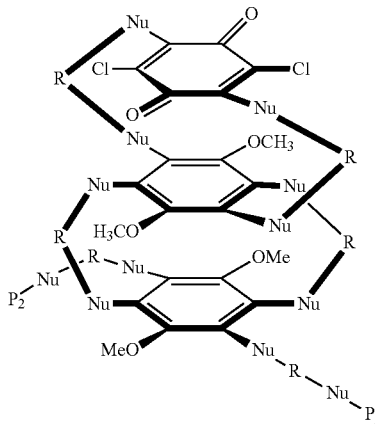
Protected Block Monomer (n = 3)
Scheme 21: Polymerization of block monomers obtained from Scheme 20
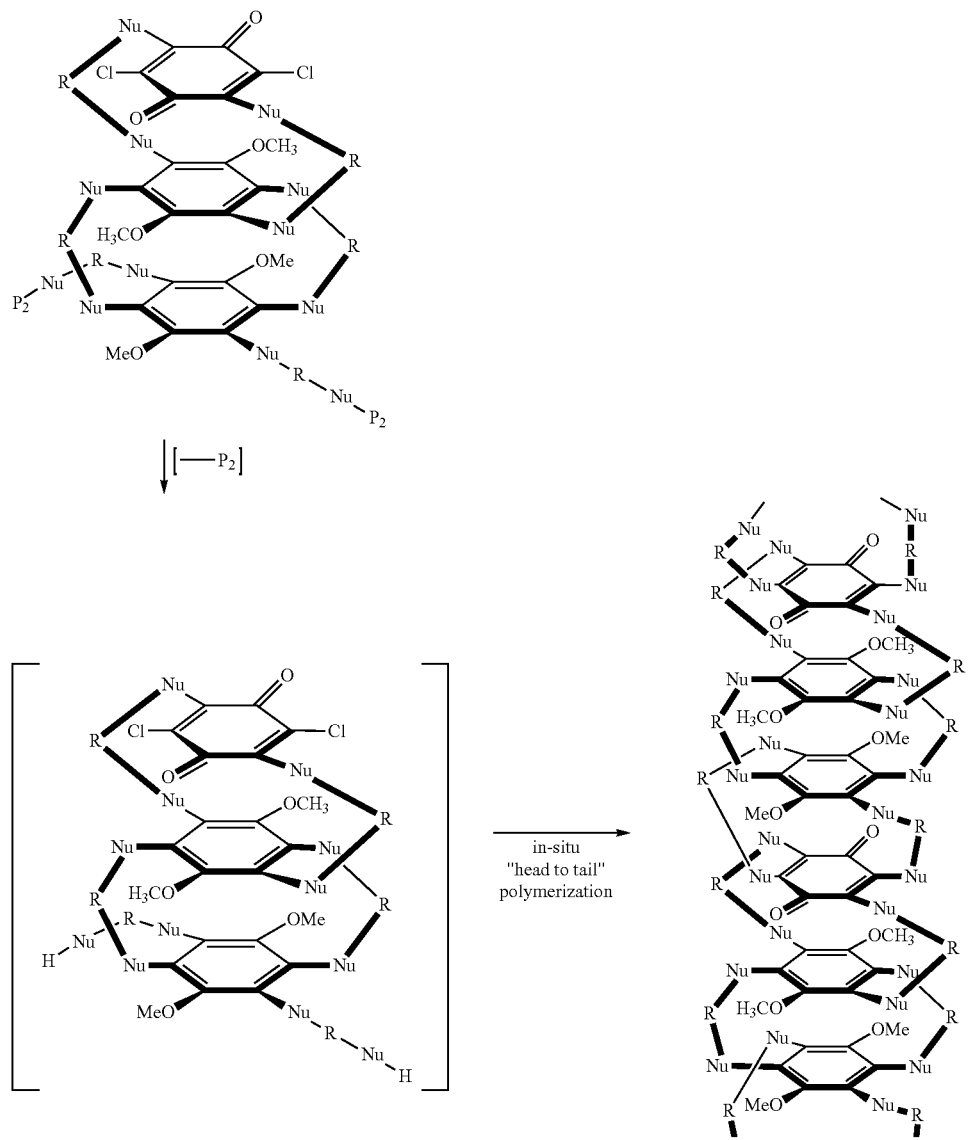

-continued

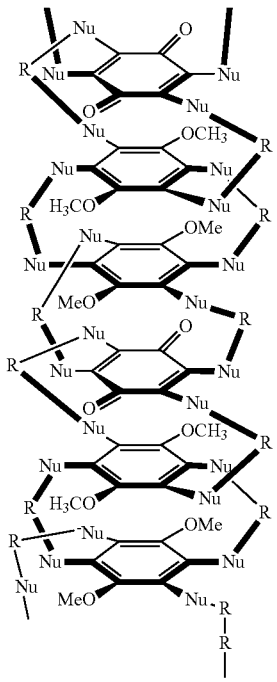

Uses

The electrically conducting polymers described herein have a wide range of applications. Examples include the following.

The polymers may be used in energy storage devices such as batteries (including flow battery), capacitors, supercapacitors, and fuel cell.

Many of the polymers of the present disclosure are photo-active. This property can be used to create solar energy when exposed to light.

The unique structure of the polymers of the present disclosure allow for more efficient quinone-hydroquinone based fluid battery systems, and may also prove useful for solid state battery systems, especially when coupled to metal cations such as lithium ions. Such polymers may therefore be used in high energy storage devices such as batteries, capacitors, or supercapacitors.

Polymers described herein may be useful for making magnetic or induced magnetic organic, or organometalic micromagnetic systems.

The polymers described herein may be used in the preparation of composite electroconductive materials, e.g., an anode or a cathode. In these composite materials, the electrically conducting polymer may be associated with a substrate, which may comprise a metal, an alloy, carbon, or another organic polymer with double conjugated bonds (e.g., those derived from acetylene or monocyclic aromatic and heteroaromatic monomers). With metal substrates, the composite electroconductive materials may be used for making electrodes that are protected against corrosion such as photoelectrodes (e.g., when used for decomposing water via solar energy). With carbon substrates, if the carbon is in the form of fibers, for example, the composite materials may be used to fabricate microelectrodes for medical devices since it is possible to deposit a microscopic amount of the electroconductive polymer onto the substrate.

The polymers may be used in fabricating photovoltaic cells and light emitting diode. Further, the polymers may be used in microelectronics to make junctions, Schottky barrier gates, and transistors, based on the semiconductor properties (n or p type) depending on the nature of the doping. Depending on doping/undoping cycles of these materials with semiconducting properties thus obtained may be used in manufacture of optical memory elements and optoelectronic devices and switches.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. A polymer comprising a plurality of units, wherein each unit is derived from an organic unsaturated planar ring monomer,
   wherein each unit of the plurality of units
   is covalently linked to at least one other unit of the plurality of units by a covalent linker,
   comprises an aromatic ring positioned in a stacked configuration in relation to an aromatic ring of an adjacent, covalently linked unit of the plurality of units, and is capable of undergoing oxidation and/or reduction; and wherein the polymer is electrically conductive;

wherein each monomer is monocyclic, bicyclic, or tricyclic, wherein the monomer may be in fully oxidized form, fully reduced form, partially reduced form, or any mixture thereof, wherein the monocyclic, the bicyclic, and the tricyclic monomer are defined by formulas I, II, and III, respectively, in their fully oxidized form

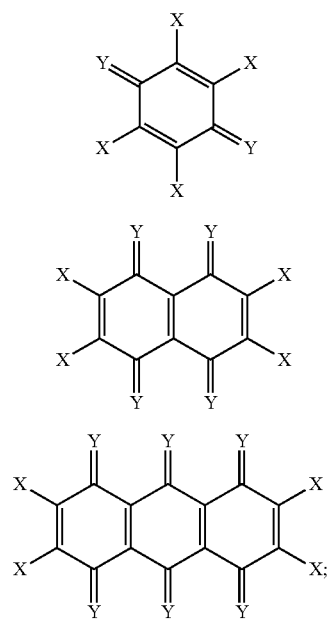

wherein

X is selected from the group consisting of —O, —S, —NR, —SiR$_2$, —CR$_2$O, and —CR$_2$, wherein the bond in each of these groups connects to the linker, wherein R is selected from the group consisting of hydrogen, C$_{1-n}$ alkyl, C$_{1-n}$ alkoxy, hydroxyl, thiol, aryl, halogen, cyano, amino, SO$_3$H, nitro, carboxyl, phosphoryl, and phosphonyl, wherein n is a number between 1 and 20;

Y is selected from the group consisting of O, S, and NR, when attached to a ring in the monomer in oxidized form; and from the group consisting of OH, SH, OR, NR$_1$R$_2$, and OSiR$_3$ when attached to a ring in the monomer in reduced form, wherein R and each of R$_1$ and R$_2$ is independently selected from the group consisting of hydrogen, alkyl, alkoxy, hydroxyl, aryl halogen, cyano, and amino; and the linker is a bond or an alkylene, saturated or unsaturated, having 1-20 carbon atoms, optionally substituted by a heteroatom containing functional group selected from the group consisting amino, cyano, hydroxyl, sulfydryl, silyl, ether, crown ether, and a metal ligand, wherein each linker connects two X groups on adjacent monomers.

2. The polymer of claim 1, wherein each monomer is in a fully oxidized (quinone) form.

3. The polymer of claim 1, wherein each monomer is in a fully reduced (hydroquinone) form.

4. The polymer of claim 1, wherein all of the monomers are in a partially oxidized or partially reduced form (semi-quinone or quinhydrone form, respectively).

5. The polymer of claim 1, wherein a portion of the monomers are in a partially oxidized or partially reduced form (semi-quinone or quinhydrone form, respectively), and the remaining monomers are in the fully oxidized or fully reduced form (quinone or hydroquinone form, respectively).

6. The polymer of claim 3, wherein the hydrogen in one or more hydroquinone moieties are replaced with metal cations.

7. The polymer of claim 6, wherein the cation is a monovalent metal cation.

8. The polymer of claim 6, wherein the cation is a divalent metal cation.

9. The polymer of claim 1, wherein X is NR.

10. The polymer of claim 9, wherein R is a methyl group.

11. The polymer of claim 1, wherein X is same in all monomers of the polymer.

12. The polymer of claim 1, wherein X is not same in all monomers of the polymer.

13. The polymer of claim 1, wherein not all X are same in a monomer.

14. The polymer of claim 1, wherein the linker is an ethylene group.

15. The polymer of claim 1, wherein each recurring unit is linked to an adjacent recurring unit by at least two linkers.

16. The polymer of claim 1, wherein the monomers are in quinone, hydroquinone, and/or semi-quinone/quinhydrone form, and wherein Y is O in the fully oxidized quinone monomer ring, Y is OH in the fully reduced hydroquinone monomer ring, and Y is O or OH in a monomer ring with mixed oxidation state.

17. The polymer of claim 1, wherein the plurality of units comprises at least eight units.

* * * * *